(12) United States Patent
Mutairi et al.

(10) Patent No.: US 12,160,447 B2
(45) Date of Patent: Dec. 3, 2024

(54) METHOD TO SAFEGUARD AGAINST EMAIL PHISHING ATTACKS

(71) Applicant: SAUDI ARABIAN OIL COMPANY, Dhahran (SA)

(72) Inventors: Baraka Mutairi, Dhahran (SA); Wail Ghanmi, Dhahran (SA); Faisal Harbi, Dhahran (SA); Baher Ramady, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 277 days.

(21) Appl. No.: 17/649,456

(22) Filed: Jan. 31, 2022

(65) Prior Publication Data

US 2023/0247051 A1 Aug. 3, 2023

(51) Int. Cl.
*H04L 9/40* (2022.01)

(52) U.S. Cl.
CPC ...... *H04L 63/1483* (2013.01); *H04L 63/0236* (2013.01)

(58) Field of Classification Search
CPC .............. H04L 63/1483; H04L 63/0236
See application file for complete search history.

(56) References Cited

U.S. PATENT DOCUMENTS

| 7,783,597 | B2 | 8/2010 | Kirsch | |
|---|---|---|---|---|
| 9,622,078 | B2 | 4/2017 | Silver et al. | |
| 11,252,189 | B2* | 2/2022 | Reiser | H04L 63/1416 |
| 11,374,970 | B2* | 6/2022 | Kolingivadi | H04L 63/20 |
| 11,470,108 | B2* | 10/2022 | Lee | H04L 63/101 |
| 11,483,344 | B2* | 10/2022 | Bratman | H04L 63/1441 |
| 11,640,470 | B1* | 5/2023 | Amar | G06Q 10/0635 726/22 |
| 11,677,758 | B2* | 6/2023 | Rasmussen | H04L 63/1416 726/23 |
| 11,924,245 | B2* | 3/2024 | Grewal | G06N 5/04 |
| 2007/0033639 | A1 | 2/2007 | Goodman et al. | |
| 2011/0061089 | A1 | 3/2011 | O'Sullivan et al. | |
| 2015/0350144 | A1 | 12/2015 | Zeng et al. | |
| 2019/0199745 | A1 | 6/2019 | Jakobsson et al. | |
| 2020/0065335 | A1* | 2/2020 | Barber | G06F 16/951 |
| 2020/0137110 | A1 | 4/2020 | Tyler et al. | |

(Continued)

FOREIGN PATENT DOCUMENTS

EP 2080324 B1 9/2018
EP 2936375 B1 11/2019

OTHER PUBLICATIONS

Office Action issued in Saudi Arabian Application No. 123441153, mailed on Jun. 18, 2024 (13 pages).

*Primary Examiner* — Viral S Lakhia
(74) *Attorney, Agent, or Firm* — Osha Bergman Watanabe & Burton LLP (57) ABSTRACT

A method for preventing an email phishing attack is disclosed. The method involves calculating a victim risk score of a user, receiving an email addressed to the user containing at least one of an attachment and a URL, based on the victim risk score of the user, performing one of: forwarding the email to the user with the at least one of the attachment and the URL, forwarding the email to the user without the at least one of the attachment and the URL, holding the email and the at least one of the attachment and URL in quarantine and blocking the email from being forwarded to the user.

10 Claims, 5 Drawing Sheets

(56) References Cited

U.S. PATENT DOCUMENTS

| | | | |
|---|---|---|---|
| 2020/0204572 A1 | 6/2020 | Jeyakumar et al. | |
| 2020/0344251 A1* | 10/2020 | Jeyakumar | G06Q 10/107 |
| 2020/0358820 A1* | 11/2020 | Kolingivadi | H04L 63/1433 |
| 2021/0014198 A1 | 1/2021 | Amoudi et al. | |
| 2021/0133331 A1 | 5/2021 | Lipkis et al. | |
| 2021/0136089 A1* | 5/2021 | Costea | G06F 21/56 |
| 2021/0266294 A1* | 8/2021 | Chechik | H04L 51/222 |
| 2021/0312400 A1* | 10/2021 | Irimie | H04L 63/1416 |
| 2021/0344710 A1 | 11/2021 | Kras et al. | |
| 2021/0344713 A1* | 11/2021 | Kras | H04L 51/18 |
| 2022/0014543 A1* | 1/2022 | Jakobsson | H04L 63/123 |
| 2023/0004638 A1* | 1/2023 | Singh | G06F 21/57 |

\* cited by examiner

METHOD TO SAFEGUARD AGAINST EMAIL PHISHING ATTACKS

BACKGROUND

Enterprise network security represents a significant investment required by corporations attempting to defend their computer networks from outside attacks. Potential attack vectors are numerous and varied. Unauthorized and malicious access by malevolent actors can come in many forms. Firewalls may be breached in order to either steal valuable information, or insert malicious code or programs intended to corrupt data or surreptitiously monitor activity. Physical security may also be breached by individuals attempting to secure direct access to a computer network. One area of particular concern is the infiltration of hackers via a corporate email system. Because of the fact that end-users are frequently not fully trained about malicious attacks, they may be easily tricked or duped into opening virus-laden attachments or innocently following URL links that ultimately lead to the downloading and execution of malicious code. This particular attack vector may be known as email phishing. Accordingly, providing a secure email system is critical to the goal of enterprise network security.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for preventing an email phishing attack, the method comprising calculating a victim risk score of a user, receiving an email addressed to the user containing at least one of an attachment and a URL, and based on the victim risk score of the user, performing one of: forwarding the email to the user with the at least one of the attachment and the URL, forwarding the email to the user without the at least one of the attachment and the URL, and blocking the email from being forwarded to the user.

In one aspect, embodiments disclosed herein relate to a non-transitory computer-readable storage media having computer-readable instructions stored thereon, which when executed by a computer cause the computer to perform the method comprising calculate a victim risk score of a user, receive an email addressed to the user containing at least one of an attachment and a URL, and based on the victim risk score of the user, perform one of: forward the email to the user with the at least one of the attachment and the URL, forward the email to the user without the at least one of the attachment and the URL, and block the email from being forwarded to the user.

In one aspect, embodiments disclosed herein relate to a computer network comprising an email security gateway; and at least one user having a terminal for accessing the email security gateway. The email security gateway is configured to calculate a victim risk score of a user, receive an email addressed to the user containing at least one of an attachment and a URL, and based on the victim risk score of the user, perform one of: forward the email to the user with the at least one of the attachment and the URL, forward the email to the user without the at least one of the attachment and the URL, and block the email from being forwarded to the user.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although various embodiments may be described with respect to a system, a non-transitory computer-readable medium, and a method, it is contemplated that embodiments with identical or substantially similar features may alternatively be implemented as methods, systems, and/or non-transitory computer-readable media.

Embodiments disclosed herein provide methods and systems that safeguard against email phishing attacks. It is another object of this disclosure to evaluate the vigilance of individual email users with regards to their ability to identify and avoid email phishing attacks.

Figure 1:
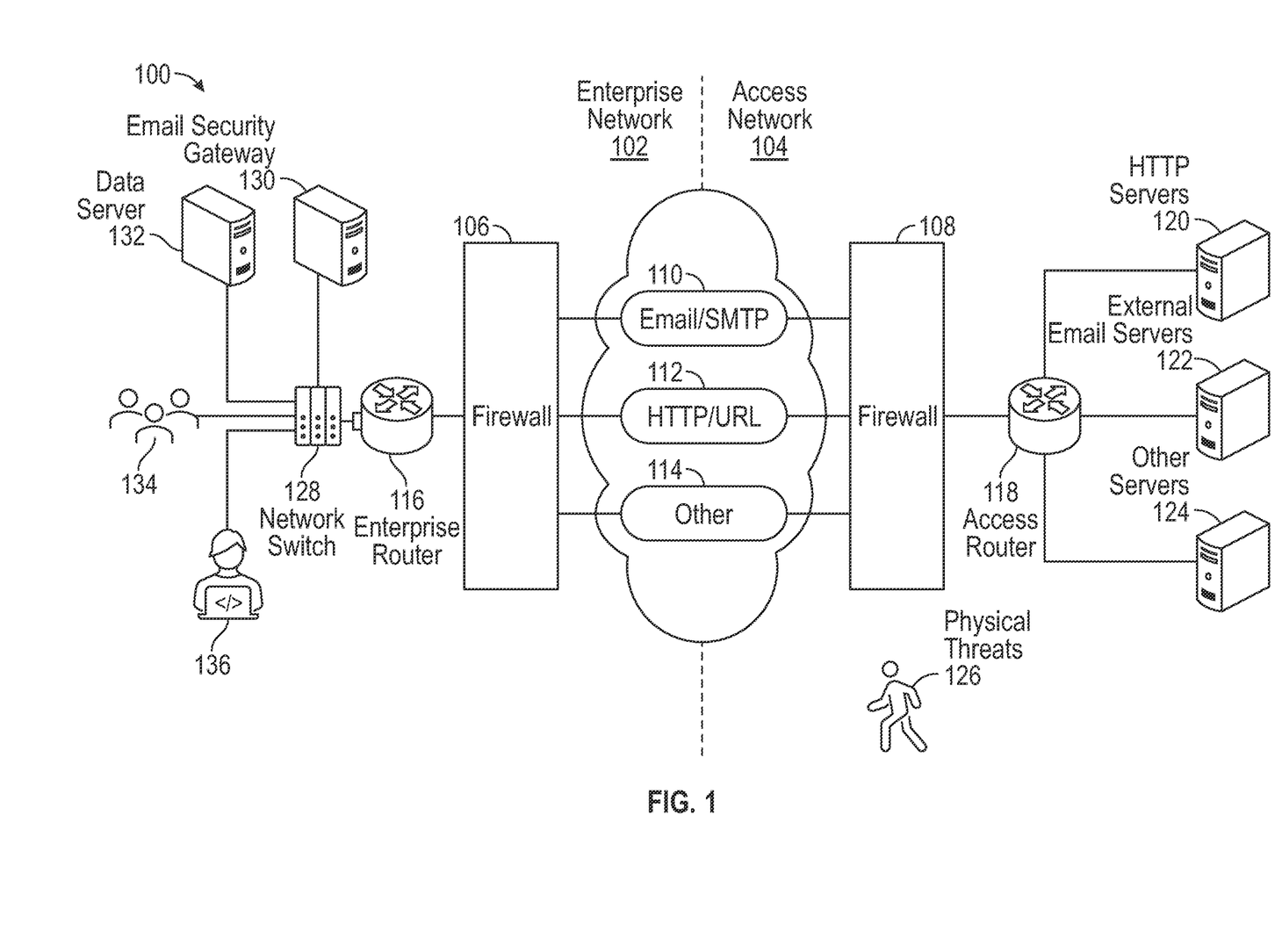
FIG. 1 shows a computer network system in accordance with one or more embodiments.

FIG. 1 shows a computer network system 100 in accordance with some embodiments. Computer network system 100 may include enterprise network 102 and access network 104. Enterprise network 102 may represent the entire contents of a company's information technology (IT) infrastructure. The particular elements depicted in enterprise network 102 are meant to be exemplary only and are not intended to be limiting. For example, in practice, enterprise network 102 may include more or less elements than are depicted in FIG. 1. At the exterior boundaries between enterprise network 102 and access network 104 may be one or more firewalls 106 and 108.

Firewall 106, which is shown as part of enterprise network 102, may be a first line of defense for protecting enterprise network 102 from a wide variety of threat vectors. In connection with its job of protecting enterprise network 102 from various threats, firewall 106 may monitor a number of traffic flows 110-114. The traffic flows 110-114 may include internet protocol (IP) traffic, but this is not meant to be limiting. For example, IP traffic represents a bulk of open systems interconnect (OSI) layer 3 traffic, but different types of layer 3 traffic and other layers of traffic are also contemplated. Traffic flows 110-114 may include email and simple mail transfer protocol (SMTP) 110, as well as hypertext transfer protocol (HTTP) 112, which provides access to a number of uniform resource locators (URLs). Firewall 106 may also monitor other traffic flows 114. Other traffic flows 114 may include a variety of transmission control protocol (TCP) and user datagram protocol (UDP) flows, which are OSI layer 4 protocols, but different types of layer 4 traffic and other layers of traffic are also contemplated. Other traffic flows 114 may include file transfer protocol (FTP) traffic, session initiation protocol (SIP) traffic, voice over internet protocol (VOIP) traffic, virtual private network (VPN) traffic, and real-time transport protocol (RTP) traffic, which provides multimedia service. By watching traffic flows 110-114, firewall 106 may be monitoring a number of ports at various layers of the OSI model.

Further, firewall 106 may be performing either or both of stateful packet inspection and deep packet inspection. Stateful packet inspection may include monitoring headers of data at the layer 3 and layer 4 tiers of the OSI reference model. Deep packet inspection may include monitoring the contents of data at deeper layers of the OSI reference model, such as layer 5-7 headers and data within datagrams, packets, and frames traversing the network. In performing all of this monitoring, firewall 106 develops a set of rules for either blocking or forwarding traffic between enterprise network 102 and access network 104. Network administrators 136 on enterprise network 102 may configure and reconfigure firewall 106 in order to optimize its operation. Finally, the information available to firewall 106 may be forwarded to email security gateway 130 on enterprise network 102, which will be discussed in further detail below.

Access network 104 may include a firewall 108. The operations of firewall 108 may be substantially similar to the operations of firewall 106. Access network 104 may further include a number of elements 118-126. Access router 118 may route traffic between firewall 108 and elements 120-126. In some embodiments, access router 118 and firewall 108 are combined into a single device that carries out both functions. In carrying out its routing functions, access router 118 may implement a number of routing protocols. For example, access router 118 may implement one or more of: border gateway protocol (BGP), open shortest path first (OSPF), multi-protocol label switching (MPLS), and asynchronous transfer mode (ATM). This list is not meant to be limiting, and access router 118 may implement various other routing protocols. On access network 104 may be a number of threat vectors 120-126. Threat vectors 120-126 include: HTTP servers 120, external email servers 122, other servers 124, and physical threats 126. Threat vectors 120-126 may be directly connected to access network 104, or they may be situated elsewhere on the Internet and have a connection to access network 104. HTTP servers 120 may include websites and URLs that deliver malicious code. In several embodiments, malicious code may include one or more of: viruses, worms, trojan horses, and malware. External email servers 122 may be malicious servers that partake in email phishing attacks. In some embodiments, email phishing attacks are scams that include complex methods for sending legitimate-looking emails that actually contain malicious code. Such an email phishing attack may include an email with an attachment containing malicious code, or an email with a URL link to one or more malicious HTTP servers 120.

Embodiments disclosed herein protect users 134 on enterprise network 102 from these email phishing attacks, as will be discussed in further detail below. Other servers 124 may include a variety of different types of threat vectors, such as malicious data servers, malicious VPN servers, and malicious multimedia servers. Physical threats 126 may include manned personnel that attempt to gain direct physical access to enterprise network 102. Physical threats 126 may operate by surreptitiously installing a direct line access to enterprise network 102 or "sniffing" for wireless signals coming from enterprise network 102. Alternatively, physical threats 126 may endeavor to perform various social engineering tricks to gain access to enterprise network 102 by impersonating employees of enterprise network 102, or tricking employees of enterprise network 102 to inadvertently granting them access by unintentionally transporting compromised hardware into enterprise network 102, such as hacked cellular phones, laptops, data disks, and universal serial bus (USB) drives.

Next, enterprise network 102 may contain a variety of elements 116 and 128-136. Enterprise router 116 may operate in a substantially similar manner to access router 118, described above. Further, information available to enterprise router 116 may be forwarded to email security gateway 130, as will be discussed in further detail below. In some embodiments, enterprise router 116 and firewall 106 are combined into a single device that carries out both functions. Enterprise network 102 may also contain a network switch 128 that connects all of the components of enterprise network 102. In some embodiments, enterprise router 116 and network switch 128 are combined into a single device that carries out both functions. In some embodiments, access router 116, network switch 128, and firewall 106 are combined into a single device that carries out all three functions. Enterprise network 102 may also contain an email security gateway 130 that protects against email phishing attacks, as will be discussed in further detail below. Enterprise network 102 may also include a data server 132. Data server 132 may be a Linux server, a Unix server, an active directory (AD) server, or a macOS™ server. One function of data server 132 may be controlling and authenticating users 134. In one or more embodiments, users 134 on enterprise network represent all users accessing enterprise network 102, such as employees, managers, contractors, IT staff, and visitors that are granted temporary access. It will be appreciated that protecting users 134 from email phishing attacks is an important, complex, and multi-faceted endeavor. Specific methods for providing such protection will be discussed in further detail below. Lastly, enterprise network 102 may be provided with one or more network administrators 136. Network administrators 136 may be in charge of configuring and reconfiguring every element of enterprise network 102 in order to optimize the network and provide the highest level of threat protection. Users 134 and network administrators 136 may access enterprise network 102 via one or more computing devices, which will be discussed in further detail below.

Figure 2:
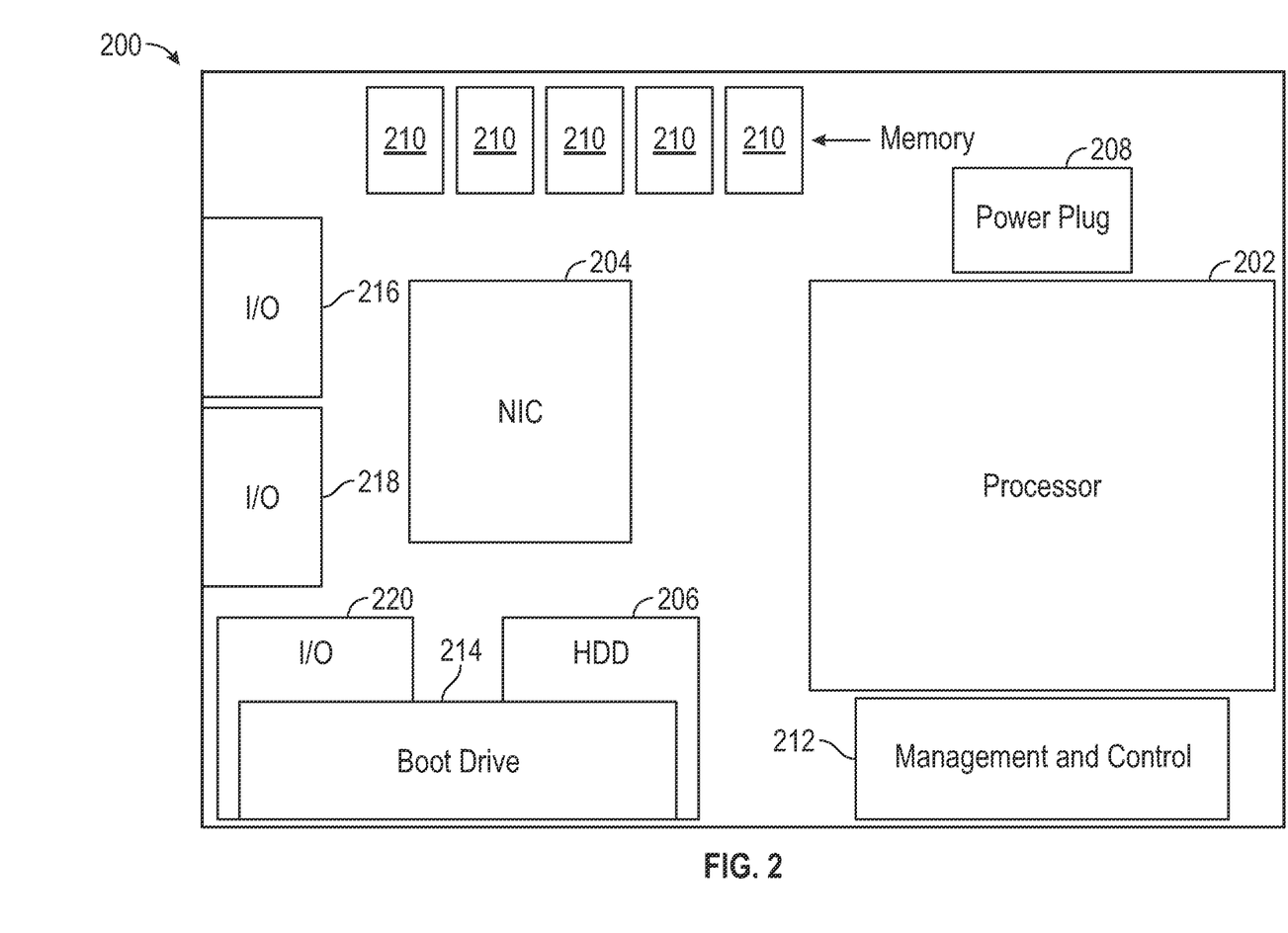
FIG. 2 shows a computing device in accordance with one or more embodiments.

FIG. 2 shows a computing device 200 in accordance with one or more embodiments. The computing device 200 may comprise essential elements of operation for one or more of devices 106, 116, and 128-136 on enterprise network 102. However, this disclosure is not meant to be limiting. For example, devices 106, 116, and 128-136 on enterprise network 102 may include more or less elements than are depicted on computing device 200. The example computing device 200 includes processor 202, memory devices 210, power plug 208, network interface controller (NIC) 204, hard disk drive (HDD) 206, management and control circuit 212, boot drive 214, and input output (I/O) circuitry 216-220. Processor 202 comprises a processor and interface for communicating with various sensors and transducers via NIC 204 over I/O circuitry 216-220. Processor 202 also comprises a communication interface with memory 210. In some embodiments processor 202 may be an SoC (System-on-a-Chip), a general purpose processor, an application specific integrated circuit (ASIC), or another device that provides processing capability and communicates with I/O circuitry 216-220. In some embodiments, management and control circuit 212 manages conditions of computing device 200 such as temperature conditions. In some embodiments, management and control circuit 212 includes an interface for connecting with an external heath monitoring system, such as an intelligent platform management interface (IPMI). In some embodiments, memory devices 210 are RAM devices such as double data rate fourth generation synchronous dynamic random-access memory (DDR4) or other suitable RAM devices.

Power connector 208 may be configured to receive electrical power via a cable connection, and in some embodiments, power connector 208 may be configured to couple with a backplane and receive electrical power via the backplane. In some embodiments, boot drive 214 is a solid state drive that stores program instructions for booting computing device 200. In some embodiments, boot instructions for computing device 200 may be stored in a remote location and boot drive 214 may be omitted.

Processor 202 communicates over I/O circuitry 216-220 with the aid of NIC 204. In some embodiments, I/O circuitry 216-220 may provide wired connections, such as small form factor pluggable IEEE 802.3 Ethernet ports or other suitable ports for a wired connection. I/O circuitry 216-220 may also support wireless connections, such as IEEE 802.11 WLAN connections, 3GPP 4G and 5G cellular connections, or a combination of both. I/O circuitry 216-220 may all provide wired connections, all provide wireless connections, or provide both wireless and wired connections.

HDD 206 may permanently store data and programs necessary for the functioning of computing device 200. HDD 206 may include traditional storage technology such as rotating magnetic platters that are accessed by one or more electromagnetic heads, or HDD 206 may include newer solid state disks (SSDs) that store information in flash memory, such as NAND flash and/or NOR flash. HDD 206 may employ any number of long-term storage transfer protocols, such as Parallel ATA (PATA), Serial ATA (SATA), and/or Small Computer System Interface (SCSI). HDD 206 may contain one or more programs that guide the operations of computing device 200 in communication with the various elements 106, 116, and 128-136 on enterprise network 102. In this manner, computing device 200 may provide closed-loop feedback control of email security procedures, as will be discussed in further detail below. The programs on HDD 206 may convert the components of computing device 200 from a general purpose computer to a special purpose computer for defending against email phishing attacks. Computing device 200 may execute different programs depending on what type of operation is needed for a given situation, as will be discussed in further detail below.

The term "storage mechanism" includes any type of memory, storage device or other mechanism for maintaining instructions or data in any format. "Computer-readable medium" is an extensible term including any memory, storage device, storage mechanism, and any other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "computer-readable storage medium" may refer to only tangible types of computer-readable media, which excludes intangible, transitory media, such as signals and carrier waves.

Figure 3:
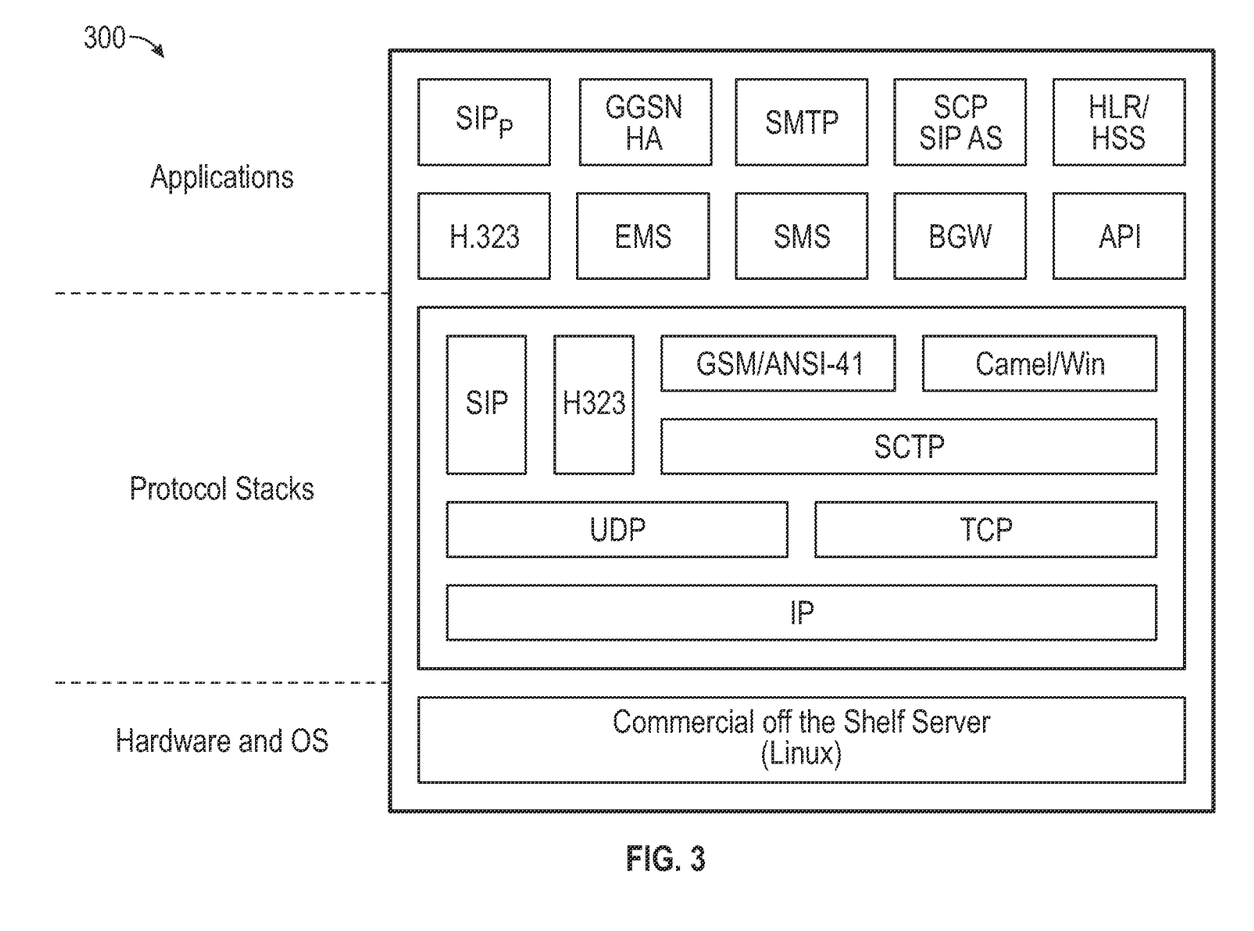
FIG. 3 shows elements of an email security gateway in accordance with one or more embodiments.

FIG. 3 shows additional configuration elements 300 that may be present on email security gateway 130, in addition to the features already provided by computing device 200. The additional configuration elements 300 provided on email security gateway 130 may be a combination of hardware and software elements. The additional configuration elements 300 provided on email security gateway 130 may help email security gateway 130 assist in preventing email phishing attacks, as will be discussed in further detail below.

In similar fashion to data server 132 described above in FIG. 2, email security gateway 130 may be a Linux server, a Unix server, an active directory (AD) server, or a macOS™ server. This is depicted by the top level of hardware and OS being referred to as a commercial off the shelf server. Next, a middle level of additional configuration elements 300 depicts various protocol stacks. The protocol stacks available on email security gateway 130 may be IP, UDP, TCP, and SIP, just to name a few. Lastly, additional configuration elements 300 present on email security gateway 130 may also include a last layer of applications. The applications may include SIP, short message service (SMS), and simple mail transfer protocol (SMTP). As will be discussed in further detail below, operation of email security gateway 130 may include calculating a score for each of users 134 that indicates their likelihood of falling victim to an email phishing attack. This score may be referred to as a victim risk score. Users 134 with a low score may be considered at low risk for falling victim to an email phishing attack. Conversely, users 134 with a high victim risk score may be considered at high risk for falling victim to an email phishing attach. Based on the victim risk scores associated with each of users 134, email security gateway 130 may take a number of mitigation steps tailored to each user 134 in order to prevent each user 134 from falling victim to an email phishing attack. The mitigation steps may include removing web links and attachments from email sent to users 134 that have high victim risk scores. Conversely, email security gateway 130 may not remove web links and attachments in email sent to users 134 that have low victim risk scores. Lastly, for users 134 that have medium victim risk scores, email security gateway 130 may remove some web links and attachments from email sent to these users 134, while leaving in other web links and email attachments in email sent to these users 134.

Calculation of the victim risk scores by email security gateway 130 may be done by weighing a number of factors related to each of users 134. For example, email security gateway 130 may calculate the victim risk score for a user 134 based on one or more of: attendance or absence from mandatory cybersecurity or other company mandated training courses, positive or negative phishing test results, web browsing history, and received spam email history.

Figure 4:
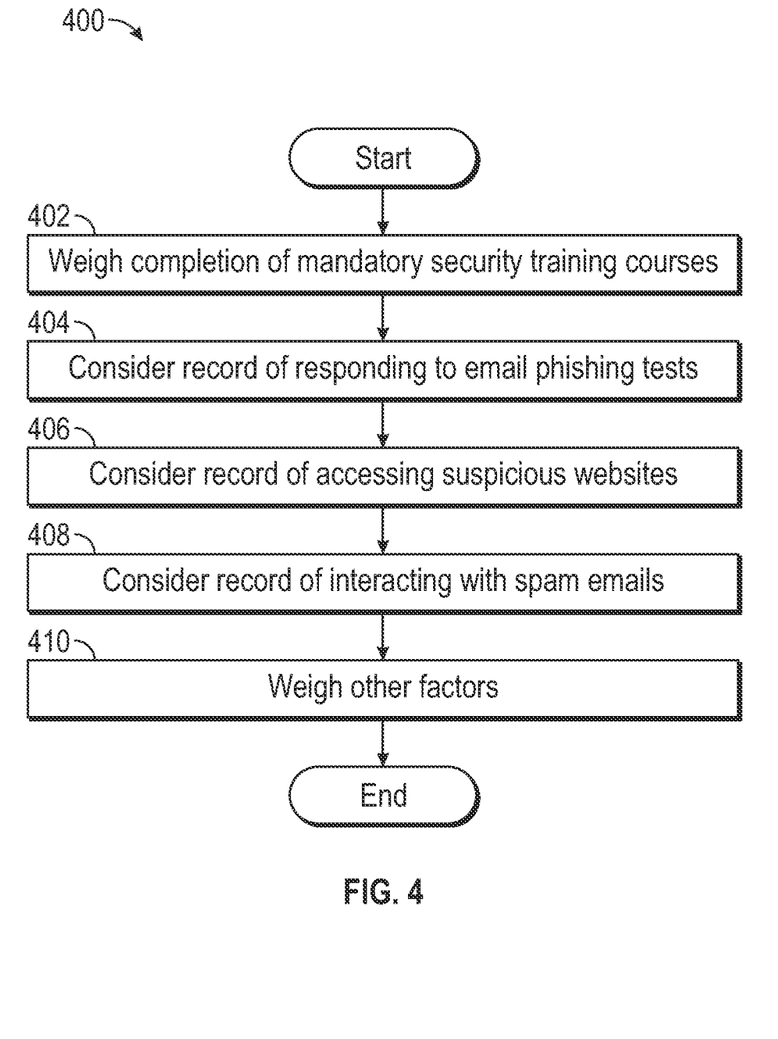
FIG. 4 shows a flowchart for a method of calculating a victim risk score in accordance with one or more embodiments.

FIG. 4 shows a flowchart for method of calculating a victim risk score in accordance with one or more embodiments. One or more blocks in FIG. 4 may be performed by one or more components as described in FIGS. 1-3. In one embodiment, the method depicted in FIG. 4 is performed by email security gateway 130. Each of blocks 402-410 may include calculating a portion of a user's total victim risk score. The terms user and person may be used interchangeably. In one embodiment, step 402 contributes to 20% of the score, step 404 contributes to 40% of the score, step 406 contributes to 20% of the score, and step 408 contributes to 20% of the score. Those skilled in the art will appreciate that these are example weights associated with each step and that these percentages may be more or less without departing from the scope herein. Step 410 may adjust the user's score based on other factors. The maximum score available to a user may be 100%. In one or more embodiments, different percentages than discussed above may be assigned to each of steps 402-410 without departing from the spirit and scope of the invention.

The process begins at step 402, which includes weighing a user's completion or lack of completion of mandatory security training courses. By completing the mandatory security training, a user may receive the full 20% available at this step. In some embodiments, failing to complete the training in this step may reduce a person's score by 10%. The scores calculated in this step may be averaged out every 1 month, for example.

Next, the process continues to step 404, which includes considering a user's record of responding to phishing test emails. These emails may be sent out monthly and contain innocent-looking data intended to fool the individual into accessing a given attachment or URL. If the person does not fall victim to this test phishing attack, they may receive the full 40% available at this step. Conversely, if the person does fall victim to the test phishing attack, they may receive a 0% at this step. Lastly, if the person has a natural response to the test phishing attack, they may receive a 10% at this step. The score in this step will be averaged out every 4 months. However, once the person receives a negative response, it may not be averaged out for another 4 months.

Next, the process continues at step 406, which includes considering a person's record of accessing suspicious websites. This step may include, in one or more embodiments, determining a person's record of accessing websites categorized as "potential spam email source" based on web security gateway category engine "websense." Accessing more than 10 such websites a week will lower down the person's score by 5% out of the possible 20%. This portion of the score is averaged out every 1 month, for example.

Next, the process continues at step 408, which includes considering a person's record of accessing spam emails. The person's record of receiving spam emails may be classified by an email security gateway spam engine. In one embodiment, in a 1-week period if the person receives more than 10 such emails, this will lower the person's score by 5% out of the possible 20%. This portion of the score is averaged out every 1 month, for example.

Lastly, the process continues at step 410, which includes weighing other factors that effect a person's score. Such other factors may include one or more of: the strength of the person's password, the frequency of the person to lose/change their password, the frequency of the person to lose their physical access security badge for entering the premises of enterprise security network 102, and the user's history of allowing unauthorized users to enter the premises of enterprise security network 102. Further, the weighing of other factors in step 410 may also include accessing extra network data available on one or more of: firewall 106, enterprise router 116, network switch 128, and data server 132. For example, the extra network data that influences the person's score at step 410 may indicate what types of traffic flows this particular user has initiated, and have been monitored by firewall 106. User's that access risky types of data may have their score correspondingly reduced. Lastly, the other factors weighed at step 410 may also include evaluating the particular user's tendency to introduce unauthorized devices into enterprise network 102, such as unauthorized laptops, cellular phones, and USB drives. All of the factors considered at step 410 may raise or lower the person's overall victim risk score. Other factors may also be considered, for example, employee work ethics may be considered as factor where a person with low performance rating, punctuality issues or reported violation might not be trustworthy to apply reasonable judgment when he receive phishing email links or attachment. Such additional factors may be added to the scoring system.

Figure 5:
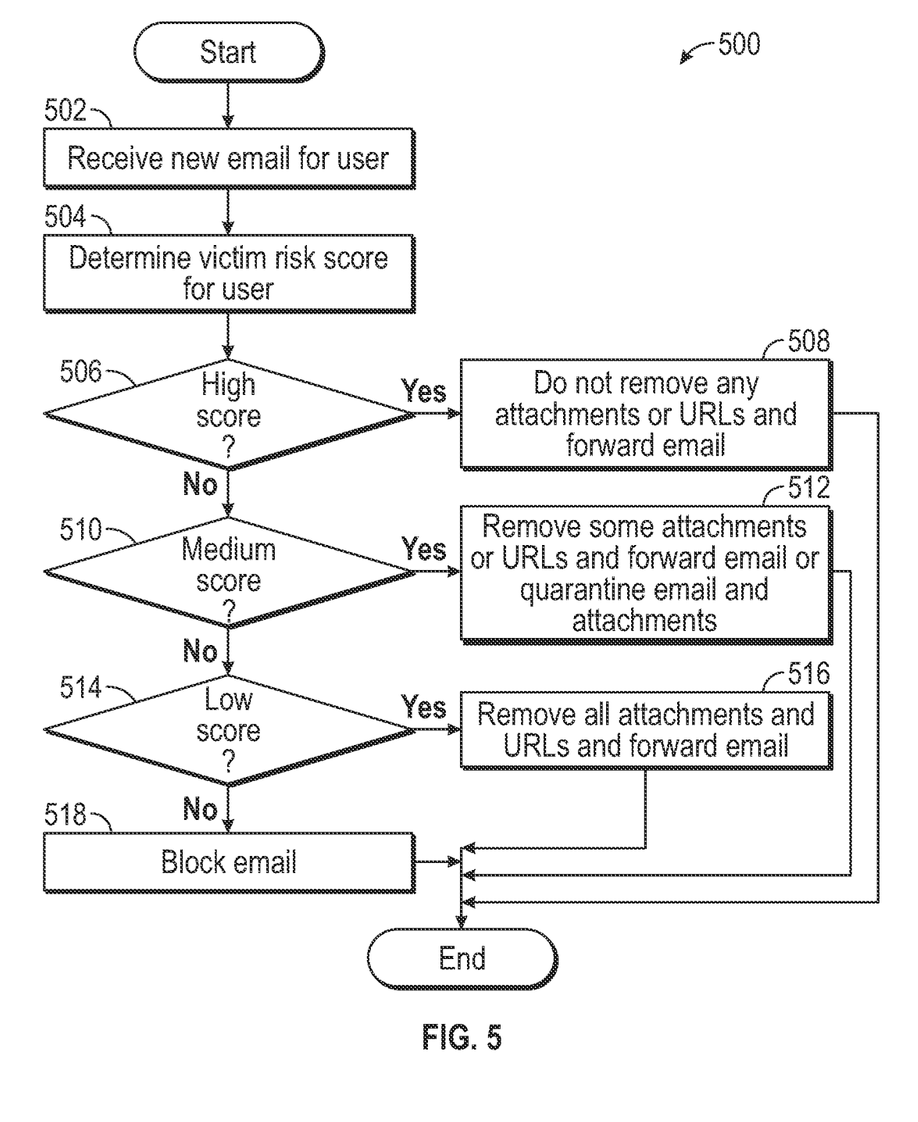
FIG. 5 shows a flowchart for a method of processing new email received for a user in accordance with one or more embodiments.

FIG. 5 shows a flowchart for method of processing new email received for a user in accordance with one or more embodiments. One or more blocks in FIG. 4 may be performed by one or more components as described in FIGS. 1-3. In one embodiment, the method depicted in FIG. 4 is performed by email security gateway 130.

The process begins at step 502, which includes receiving a new email for a particular user. Next, the process proceeds to step 504, which includes determining the victim risk score of the particular user. This step may include performing the method of FIG. 4 to determine the score, or accessing a database of the particular user's score that already contains stored entries from previous iterations of performing the method of FIG. 4 used to calculate the user's score. This step may also include simply updating the user's score based on one or more of steps 402-410. The decision of whether to update the user's score in step 504 may be determined based on evaluating whether recalculating the results of any of steps 402-410 would result in a change to the particular user's score. Next, the process proceeds to step 506, which involves determining whether the particular user has a high score. In one embodiment, a high score is considered to be 60% or higher. This value is exemplary only, though, and a high score may also be determined as any that exceeds 40%, 50%, 60%, 70%, 80%, or 90%. Other high score values may be contemplated without departing from the spirit and scope of the invention. If the user is determined to have a high score at step 506, then the process proceeds to step 508 where the email is forwarded to the user without any attachments or URLs being removed therefrom. After this, the process ends.

In some embodiments, if the user is determined to not have a high score at step 506, the process may proceed to step 510, which determines whether the user has a medium score. A medium score in this step may be referred to as any score that is greater than 30% and less than 60%; however, other ranges of medium scores may be contemplated without departing from the spirit and scope of the invention. If the user is determined to have a medium score at step 510, then the process proceeds to step 512 where the email is forwarded to the user with some attachments and URLs being removed therefrom, or the email attachment is held in quarantine and released once the user's score has improved. The method of removing some email attachments and URLs at this step may be based on one or more of: the exact user's victim score, and a rating of how suspicious the particular email attachments and URLs appear to be. After this step, the process ends.

Although not shown in FIG. 5, it is also possible based on step 506 that once the user is discovered to not have a high score, the email is forwarded to the user with all attachments and URLs removed, and then the process ends. Thus, in one or more embodiments, the flow chart could move from step 506 to step 516 and then end.

In some embodiments, if the user is determined to not have a medium score at step 510, then the email is not forwarded to the user, and then the process ends. However, in some embodiments, if the user is determined to not have a medium score at step 510, the process may proceed to step 514, which determines whether the user has a low score. A low score in this step may be referred to as any score that is greater than 10% and less than 30%; however, other ranges of low scores may be contemplated without departing from the spirit and scope of the invention. If the user is determined to have a low score at step 510, then the process proceeds to step 516 where the email is forwarded to the user all attachments and URLs being removed therefrom. After this, the process ends.

If at step 514 the user is determined to not have a low score (or has a score of less than 10%), then the process proceeds to step 518 where the email is blocked. After this, the process ends. Thus, if the user's score is zero or below a given company threshold, the email is blocked from delivery altogether.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for preventing an email phishing attack, the method comprising:
   calculating a victim risk score of an email recipient user;
   receiving an email addressed to the email recipient user containing at least one of an attachment and a URL;
   based on the victim risk score of the email recipient user, performing one of: forwarding the email to the email recipient user with the at least one of the attachment and the URL, forwarding the email to the email recipient user without the at least one of the attachment and the URL, and blocking the email from being forwarded to the email recipient user,
   wherein calculating the risk score of the email recipient user comprises weighing the email recipient user's record with regards to performing various computer tasks by doing all of: weighing the user's completion of mandatory security training courses, consider the user's record of responding to email phishing tests, considering the user's record of accessing suspicious websites, considering the user's record of interacting with spam emails.

2. The method of claim 1, wherein weighing the user's record with regards to performing various computer tasks comprises: weighing other factors related to the user, wherein the other factors related to the user comprise one or more of: the strength of the user's password, the frequency of the user to lose their physical access security badge, and evaluating the user's tendency to introduce unauthorized devices into and enterprise network.

3. The method of claim 1, wherein the victim risk score of the user is one of: high, medium and low; and the method forwards the email to the user with the at least one of the attachment and the URL when the victim risk score of the user is high, holds the email and attachments in quarantine when the victim risk score of the user is medium, and blocks the email from being forwarded to the user when the victim risk score of the user is low.

4. A non-transitory computer-readable storage media having computer-readable instructions stored thereon, which when executed by a computer cause the computer to perform the method comprising:
   calculate a victim risk score of an email recipient user;
   receive an email addressed to the email recipient user containing at least one of an attachment and a URL;
   based on the victim risk score of the email recipient user, perform one of: forward the email to the email recipient user with the at least one of the attachment and the URL, forward the email to the email recipient user without the at least one of the attachment and the URL, and block the email from being forwarded to the email recipient user,
   wherein calculating the risk score of the email recipient user comprises weighing the email recipient user's record with regards to performing various computer tasks by doing all of: weighing the user's completion of mandatory security training courses, consider the user's record of responding to email phishing tests, considering the user's record of accessing suspicious websites, considering the user's record of interacting with spam emails.

5. The non-transitory computer-readable storage media of claim 4, wherein weighing the user's record with regards to performing various computer tasks comprises: weighing other factors related to the user, wherein the other factors related to the user comprise one or more of: the strength of the user's password, the frequency of the user to lose their physical access security badge, and evaluating the user's tendency to introduce unauthorized devices into and enterprise network.

6. The non-transitory computer-readable storage media of claim 4, wherein the victim risk score of the user is one of: high, medium and low; and the method forwards the email to the user with the at least one of the attachment and the URL when the victim risk score of the user is high, holds the email and attachments in quarantine when the victim risk score of the user is medium, and blocks the email from being forwarded to the user when the victim risk score of the user is low.

7. A computer network comprising:
an email security gateway; and
at least one email recipient user having a terminal for accessing the email security gateway,
wherein the email security gateway is configured to:
calculate a victim risk score of an email recipient user;
receive an email addressed to the email recipient user containing at least one of an attachment and a URL;
based on the victim risk score of the email recipient user, perform one of: forward the email to the email recipient user with the at least one of the attachment and the URL, forward the email to the email recipient user without the at least one of the attachment and the URL, and block the email from being forwarded to the email recipient user,
wherein calculating the risk score of the email recipient user comprises weighing the email recipient user's record with regards to performing various computer tasks by doing all of: weighing the user's completion of mandatory security training courses, consider the user's record of responding to email phishing tests, considering the user's record of accessing suspicious websites, considering the user's record of interacting with spam emails.

8. The computer network of claim 7, wherein weighing the user's record with regards to performing various computer tasks comprises:
weighing other factors related to the user, wherein the other factors related to the user comprise one or more of: the strength of the user's password, the frequency of the user to lose their physical access security badge, and evaluating the user's tendency to introduce unauthorized devices into and enterprise network.

9. The computer network of claim 7, wherein the victim risk score of the user is one of: high, medium and low; and the method forwards the email to the user with the at least one of the attachment and the URL when the victim risk score of the user is high, holds the email and at least one of the attachment and URL in quarantine when the victim risk score of the user is medium, and blocks the email from being forwarded to the user when the victim risk score of the user is low.

10. The computer network of claim 9, wherein the email and the at least one of the attachment and URL is held in quarantine until the user's victim risk score improves.

\* \* \* \* \*